(12) United States Patent
Bharat et al.

(10) Patent No.: US 7,346,604 B1
(45) Date of Patent: Mar. 18, 2008

(54) METHOD FOR RANKING HYPERTEXT SEARCH RESULTS BY ANALYSIS OF HYPERLINKS FROM EXPERT DOCUMENTS AND KEYWORD SCOPE

(75) Inventors: Krishna A. Bharat, Santa Clara, CA (US); George A. Mihaila, Toronto (CA)

(73) Assignee: Hewlett-Packard Development Company, L.P., Houston, TX (US)

( * ) Notice: Subject to any disclaimer, the term of this patent is extended or adjusted under 35 U.S.C. 154(b) by 588 days.

(21) Appl. No.: 09/418,418

(22) Filed: Oct. 15, 1999

(51) Int. Cl.
*G06F 17/30* (2006.01)
(52) U.S. Cl. .................................. 707/3; 707/4; 707/10
(58) Field of Classification Search ............... 707/3, 707/5, 501, 513, 4, 10
See application file for complete search history.

(56) References Cited

U.S. PATENT DOCUMENTS

| | | | | |
|---|---|---|---|---|
| 6,067,552 | A * | 5/2000 | Yu .............................. | 707/501 |
| 6,285,999 | B1 * | 9/2001 | Page ............................. | 707/5 |
| 6,304,864 | B1 * | 10/2001 | Liddy et al. .................. | 706/15 |
| 6,418,433 | B1 * | 7/2002 | Chakrabarti et al. .......... | 707/5 |
| 6,493,702 | B1 * | 12/2002 | Adar et al. .................... | 707/3 |
| 6,564,202 | B1 * | 5/2003 | Schuetze et al. .............. | 707/2 |
| 6,567,797 | B1 * | 5/2003 | Schuetze et al. .............. | 707/2 |
| 6,598,054 | B2 * | 7/2003 | Schuetze et al. ......... | 707/103 R |
| 6,728,752 | B1 * | 4/2004 | Chen et al. ................... | 707/10 |
| 6,862,710 | B1 * | 3/2005 | Marchisio .................... | 707/10 |

OTHER PUBLICATIONS

Chakrabarti et al., "Automatic resource compilation by analyzing hyperlink structure and associated text", Apr. 14, 1998.*

Oliver A. McBryan, "GENVL and WWWW: Tools for Taming the Web", May 1994.*

One-page document entitled "Yahoo!," http://www.yahoo.com.

Two-page document entitled "About.com—Human Guides. Human Interests. Expert guidance from hundreds of Guides," http://www.miningco.com/.

One-page document entitled "Direct Hit—Home of the Award-Winning Popularity Engine," http://www.directhit.com/.

Document entitled "Automatic resource compilation by analyzing hyperlink structure and associated text," by Soumen Chakrabarti, Byron Dom, Prabhakar Raghavan, Sridhar Rajagopalan, David Gibson and Jon Kleinberg, http://decweb.ethz.ch/WWW7/1898/com1898.htm, pp. 1-13.

Document entitled "Improved Algorithms for Topic Distillation in a Hyperlinked Environment," by Krishna Bharat and Monika R. Henzinger, pp. 1-9.

Document entitled "The Anatomy of a Large-Scale Hypertextual Web Search Engine," by Sergey Brin and Lawrence Page, 18-page document, http://google.stanford.edu/long321.htm.

Krishna Bharat, et al., "Improved Algorithms For Topical Distillation In A Hyperlinked Environment," pp. 104-111, Proceedings of the 21st Annual International ACM SIGIR Conference on Research and Development in Information Retrieval, Aug. 24-28, 1998.

(Continued)

*Primary Examiner*—John Breene
*Assistant Examiner*—Baoquoc N. To

(57) ABSTRACT

A computer-implemented method and system for determining search results for a search query for hypertext documents. The hypertext documents are reviewed to determine expert documents. When a query is received, the expert documents are ranked in accordance with the query. Then the target documents of the ranked expert documents are ranked to determine the search result set.

22 Claims, 11 Drawing Sheets

OTHER PUBLICATIONS

Sergey Brin, et al., "The Anatomy of a Large-Scale Hypertextual Web Search Engine," pp. 1-14, Proceedings of the Seventh International World Wide Web Conference, Brisbane, Australia, Apr. 14-18, 1998.

O.A. McBryan, "GENVL and WWWW: Tools for taming the Web," Abstracts/Computer Networks and ISDN Systems 27, Proceedings of the 1st International World Wide Web Conference, editor O. Nierstrasz, Geneva, Switzerland, May 1994.

Chakrabarti, et al., "Focused Crawling: A New Approach to Topic-Specific Web Resource Discovery," Proceedinggs of the Eighth Annual International World Wide Web Conference, Toronto, Canada, May 11-14, 1999.

* cited by examiner

Responding to a Search Query

Determining Expert Pages

Determining Expert Pages

Adding Keywords to the Expert Reverse Index

URL Lists

Example Expert Reverse Index

Ranking Expert Pages for a Current Query

Target Ranking

Mutually Affiliated Experts

Mutually Affiliated Expert and Target

Determining if Two Pages are Affiliated

METHOD FOR RANKING HYPERTEXT SEARCH RESULTS BY ANALYSIS OF HYPERLINKS FROM EXPERT DOCUMENTS AND KEYWORD SCOPE

BACKGROUND OF THE INVENTION

1. Field of the Invention

The present invention relates generally to software programs and, more specifically, to search engines that search large numbers of hypertext documents.

2. Description of Background Art

The world wide web (WWW) has grown phenomenally in recent years. At the beginning of the web's history, there were hundreds or thousands of web pages in existence. At the present time, there are millions of web pages, and the number is increasing daily. The rapid increase in the number of web pages has increased the difficulty of finding information on the web. Even though the information that a person wants may be available on the web, it is sometimes difficult to locate the page or site that contains the information.

One solution to the problem of finding information of the web is to let software programs perform the search. Various search engines have been developed that return a list of ranked documents in response to a search query. If the query is broad (i.e., it matches many documents) then the returned list is usually too long for the user to look at fully. Users typically look only at the top ranked results on the assumption that they are most relevant.

A broad search query can produce a huge result set. This set is hard to rank based on content alone, since the quality and "authoritativeness" (namely, a measure of how authoritative the page is on the subject) of pages cannot be assessed solely by analyzing their content. For example, on the WWW many pages are created for the purpose of misleading search engines and may contain spurious words that do not pertain to the topic of the page. Such pages are known popularly as "spam" pages.

Prior approaches that have used content analysis to rank broad queries cannot distinguish between authoritative and non-authoritative pages (e.g., they fail to detect spam pages). Hence the ranking of such methods cannot be relied upon.

Three approaches to improve the authoritativeness of ranked results have been taken in the past. A first approach is ranking based on human classification. Human editors to have been used to manually associate a set of categories and keywords with a subset of documents on the web. These categories and keywords are then matched against the user's query to return valid matches. This approach, however, is slow and can only be applied to a small number of pages. Furthermore, often the keywords and classifications assigned by the human judges are inadequate or incomplete. Given the rate at which the WWW is growing and the wide variation in queries this is not a comprehensive solution.

A second approach is ranking based on usage information. Some services collect information on: (a) the queries individual users submit to search services and (b) the pages they look at subsequently and the time spent on each page. This information is used to return pages that most users visit after deploying the given query. For this technique to succeed a large amount of data needs to be collected for each query. Thus, the potential set of queries on which this technique applies is small. This technique may return pages that are highly correlated but not relevant.

A third approach is ranking based on connectivity. This approach involves analyzing the hyperlinks between pages on the web on the assumption that: (a) pages on the topic link to each other, and (b) authoritative pages tend to point to other authoritative pages.

For example, a search engine that ranks pages based on assumption (b) may compute a query-independent authority score for every page on the Web and rank the result set by this score. Because such a search engine is query-independent, it cannot by itself distinguish between pages that are authoritative in general and pages that are authoritative on the query topic. It ignores the fact that a web-site that is authoritative in general may contain a page that matches a certain query but is not an authority on the topic of the query. In particular, such a page may not be considered valuable within the community of users who author pages on the topic of the query.

Still other search engines use topic distillation. Topic distillation first computes a query specific subgraph of the WWW. This computation is done by including pages on the query topic in the graph and ignoring pages not on the topic. Then the method computes a score for every page in the subgraph based on hyperlink connectivity: Every page is given an authority score. This score is computed by summing the weights of all incoming links to the page. For each such reference, its weight is computed by evaluating how good a source of links the referring page is.

A problem with Topic Distillation is that computing the subgraph of the WWW which is on the query topic is hard to do in real-time. In the ideal case every page on the WWW that deals with the query topic would need to be considered. In practice an approximation is used. A preliminary ranking for the query is done with content analysis. The top ranked result pages for the query are selected. This creates a "selected set." Then, some of the pages within one or two links from the selected set are also added to the selected set if they are on the query topic. This approach can fail because it is dependent on the comprehensiveness of the selected set for success. A highly relevant and authoritative page may be omitted from the ranking by this scheme if it either did not appear in the initial selected set, or some of the pages pointing to it were not added to the selected set. A "focused crawling" procedure to crawl the entire web to find the complete subgraph on the query's topic has been proposed, but this approach is too slow for online searching. Also, the overhead in computing the full subgraph for the query is not warranted since users only care about the top ranked results.

SUMMARY OF THE INVENTION

The described embodiment of the present invention takes an input query, which is, for example, a sequence of words input by the user, and produces a ranked list of URLs that are returned as search results.

Creation of the ranked list involves two broad phases: (a) expert lookup and (b) target ranking. An "expert page" is a page that is about a certain topic and has links to many "non-affiliated" pages on that topic. Two pages are non-affiliated conceptually if they are authored by authors from non-affiliated organizations. Expert pages are, preferably identified in a pre-processing step in which a subset of the pages crawled by a search engine are identified as experts (for example, 2.5 million of 140 million pages may be identified as experts). The pages in this subset preferably are indexed in a special inverted index called an "expert reverse index."

For a given input query, a lookup is done on the expert reverse index to find and rank matching expert pages. This phase computes the best expert pages on the query topic, as well as associated match information. The pages are ranked according to the match information.

Next, target ranking looks at the out-going links from identified expert pages. By combining relevant out-going links from many experts on the query topic, it is possible to find the pages that are most highly regarded by the community of pages related to the query topic. This is the basis of the high relevance that the described embodiment of the invention delivers.

In accordance with a preferred embodiment of the present invention as described herein, there is provided a method for searching a large number of hypertext documents in accordance with a current search query, comprising: determining which of the hypertext documents are expert documents; ranking the expert documents in accordance with the current search query; ranking target documents pointed to by the ranked expert documents; and returning a results list based on the ranked target documents.

In further accordance with a preferred embodiment of the present invention as described herein, there is provided an apparatus that searches a large number of hypertext documents in accordance with a current search query, comprising: a software portion configured to determine which of the hypertext documents are expert documents; a software portion configured to rank the expert documents in accordance with the current search query; a software portion configured to rank target documents pointed to by the ranked expert documents; and a software portion configured to return a results list based on the ranked target documents.

DETAILED DESCRIPTION OF PREFERRED EMBODIMENTS

I. General Discussion

Figure 1:
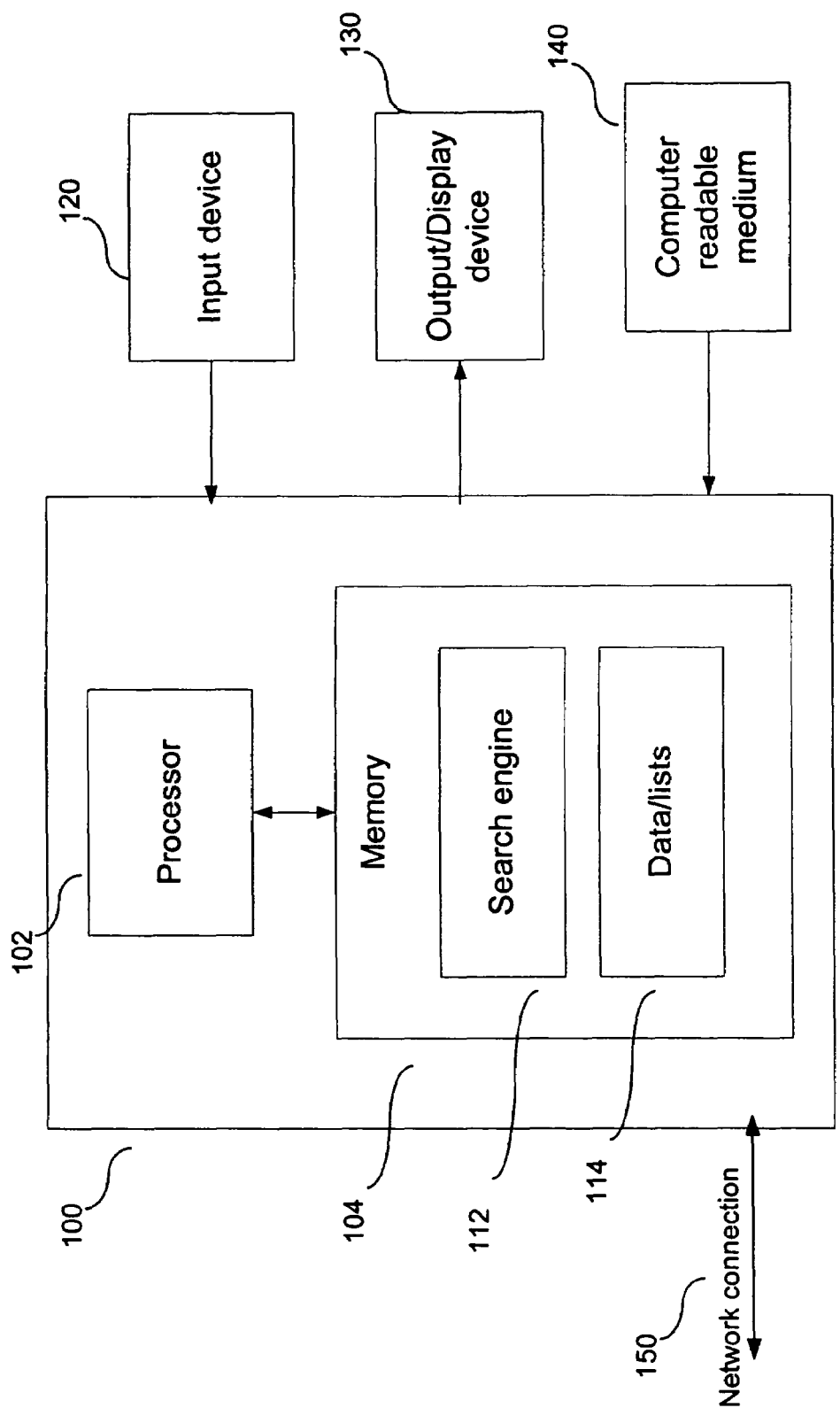
FIG. 1 is a block diagram of the overall architecture of an embodiment of the present invention.

Referring now to FIG. 1, there is shown a block diagram of the overall architecture of an embodiment of the present invention. FIG. 1 includes a data processing system 100 including a processor 102 and a memory 104. Memory 104 includes search engine software 112, which implements the methods defined herein. Memory 104 also includes data and ranked lists 114 as described herein. System 100 is connect to a network, such as the Internet, a LAN, or WAN via a connection 150. System 100 could also connect to a network via other appropriate methods, such as a wireless network or a cellular telephone connection.

The methods described herein are preferably implemented as software instructions stored in memory 104 and executed by processor 102. These instructions can also be stored on computer readable medium 140, such as disk drive, memory, CD ROM, etc. System 100 also includes an input device 120, such as a keyboard or a mouse, and an output display device 130, such as a display screen.

In other preferred embodiments, search engine 112 and data/lists 114 reside on different computers or in different memories. The search engine can also be included in a client/server model in which the search engine acts as a server, sending results lists to requesting clients in response to queries.

The described embodiment of the present invention is not particularly applicable to narrow search queries/it is generally more useful for broad searches. Thus a search service could use the scribed method for broad queries and fall back on a traditional ranking scheme for arrow queries.

II. Search Engine Implementation

Figure 2A:
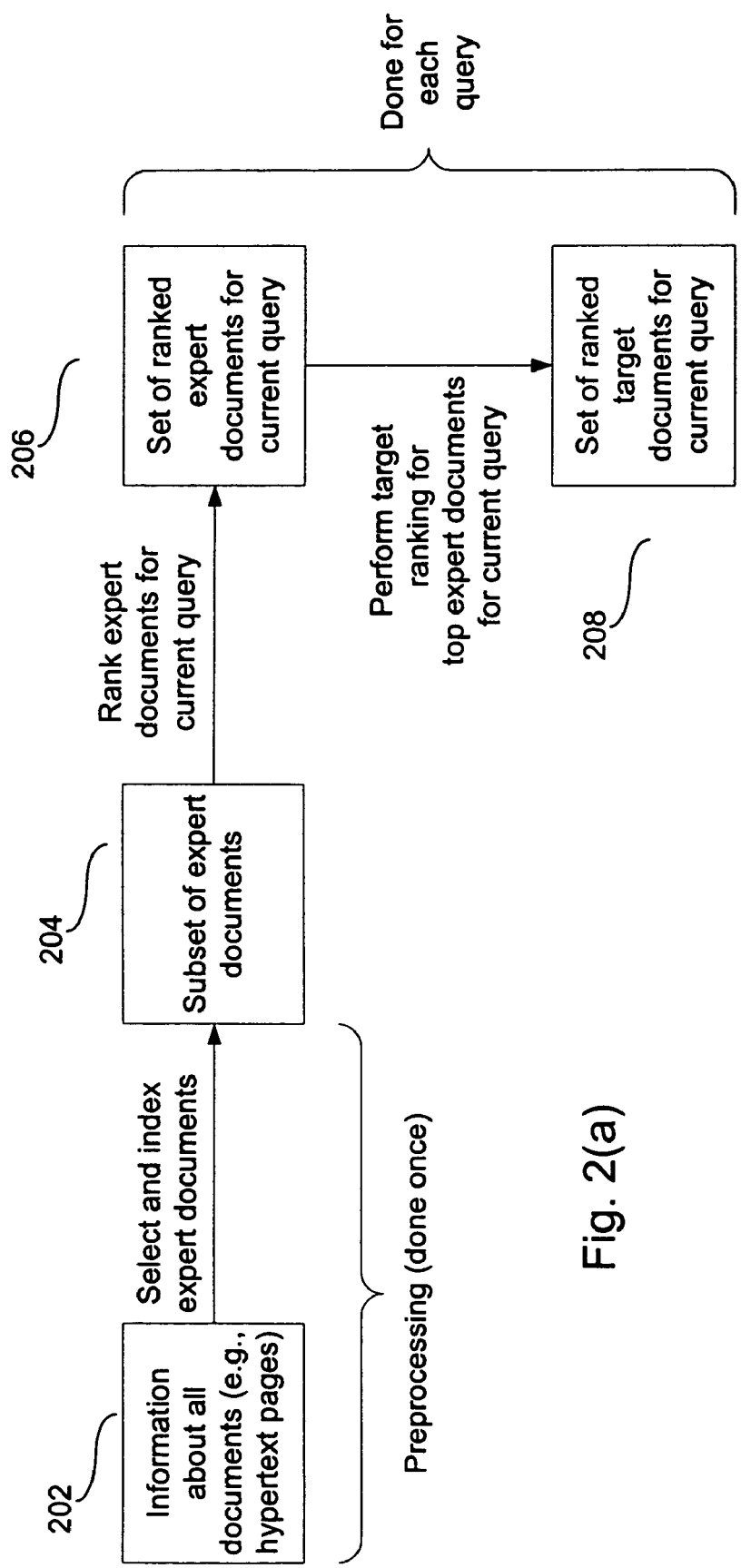
FIG. 2(a) is a block diagram giving an overview of a preferred embodiment of the present invention.

FIG. 2(a) is a block diagram giving an overview of a preferred embodiment of the present invention. In the described embodiment, an initial set of hypertext pages 202 is obtained by, for example, a crawl of the world wide web. The hypertext documents (e.g., pages) are processed to yield a set of expert documents 204. When a query is received, the expert documents are ranked in accordance with the query to yield ranked expert documents 206. The targets of the ranked expert documents are themselves ranked to yield ranked target documents 208. The ranked target documents are returned as a search result.

Figure 2B:
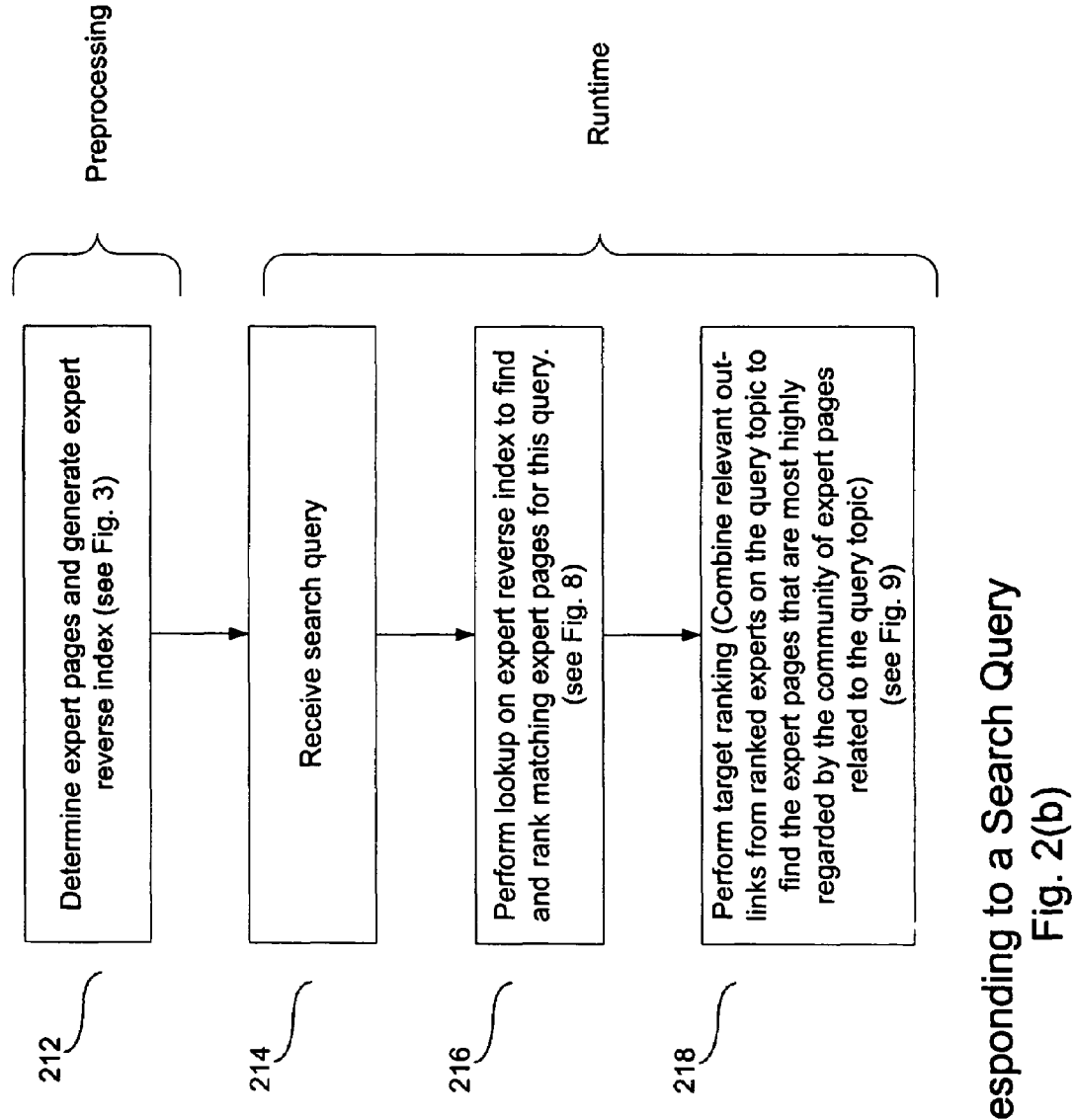
FIG. 2(b) is a flow chart of a search method in accordance with a preferred embodiment of the present invention.

FIG. 2(b) is a flow chart of a search method in accordance with a preferred embodiment of the present invention. In the following example, the hypertext documents are pages (or sites) in the world wide web. It should be understood that the present invention can also be applied to other types of hypertext linked documents, such as hypertext databases. When a search request is received, software 112 preferably returns a ranked list of possible documents. Creation of the ranked list involves two broad phases: (a) expert lookup and (b) target ranking.

An expert page is a page that is about a certain topic and has links to many non-affiliated pages on that topic. Two pages are non-affiliated conceptually if they are authored by authors from non-affiliated organizations. In a pre-processing step 212, a subset of the pages crawled by a search engine are identified as experts (for example, 2.5 million of 140 million or so pages might be found to be experts). The pages in this subset are indexed in a special inverted index called an expert reverse index.

A. Creating an Expert Reverse Index

After receipt of an input query 214, a lookup 216 is done on the expert reverse index to find and rank matching "expert pages." This phase computes the best expert pages on the query topic and as well as associated match information. Then a target ranking 218 is performed. In this embodiment, match information is defined as the location(s) where query terms occur within the expert page.

a) Determining Page Affiliation

Two pages are "affiliated" if and only if the hosts they are located on are known to be affiliated. Thus, as shown in FIG.

10, a determination about whether two pages are affiliated is made by looking at the hosts of the pages.

Two hosts are affiliated if one or both of the following is true:

(i) They share the same first 3 octets of the IP address, and (ii) The rightmost non-generic token in the hostname is the same.

In the described embodiment, only suffixes beginning with a period "." are considered. A suffix is considered generic if it occurs in a large number of distinct hosts. E.g., ".com" and ".co.uk" are domain names that occur in a large number of hosts and are hence generic suffixes. Given two hosts, if the generic suffix in each case is stripped and the subsequent right-most token is the same, they are considered to be affiliated. Tokens are substrings of the hostname delimited by ".".

For example, in comparing "www.ibm.com" and "ibm.co.mx," the generic suffixes ".com" and ".co.mx" are ignored. The resulting rightmost token is "ibm," which is the same in both cases. Hence they are considered to be affiliated. Optionally, the generic suffix could be required to be the same in both cases. The affiliation relation is transitive: if A and B are affiliated and B and C are affiliated then we take A and C to be affiliated even if there is no direct evidence of the fact. In practice some non-affiliated hosts may be classified as affiliated, but that is usually acceptable since this relation is intended to be conservative.

Preprocessing step 202 of FIG. 2(a) preferably constructs a host-affiliation lookup. Using a standard union-find method, hosts are grouped that either share the same rightmost non-generic suffix or have an IP address in common, into sets. Every set is given a unique identifier (e.g., the host with the lexicographically lowest hostname). The host-affiliation lookup maps every host to its set identifier or to itself (when there is no set). This is used to compare hosts. If the lookup maps two hosts to the same value then they are affiliated; otherwise they are non-affiliated. Thus, in the described embodiment, the test for affiliation can be done very quickly.

b) Finding Expert Pages

Step 202 preferably processes a search engine's database of pages and selects a subset which is considered to be good sources of links on specific topics, albeit unknown.

Figure 3A:
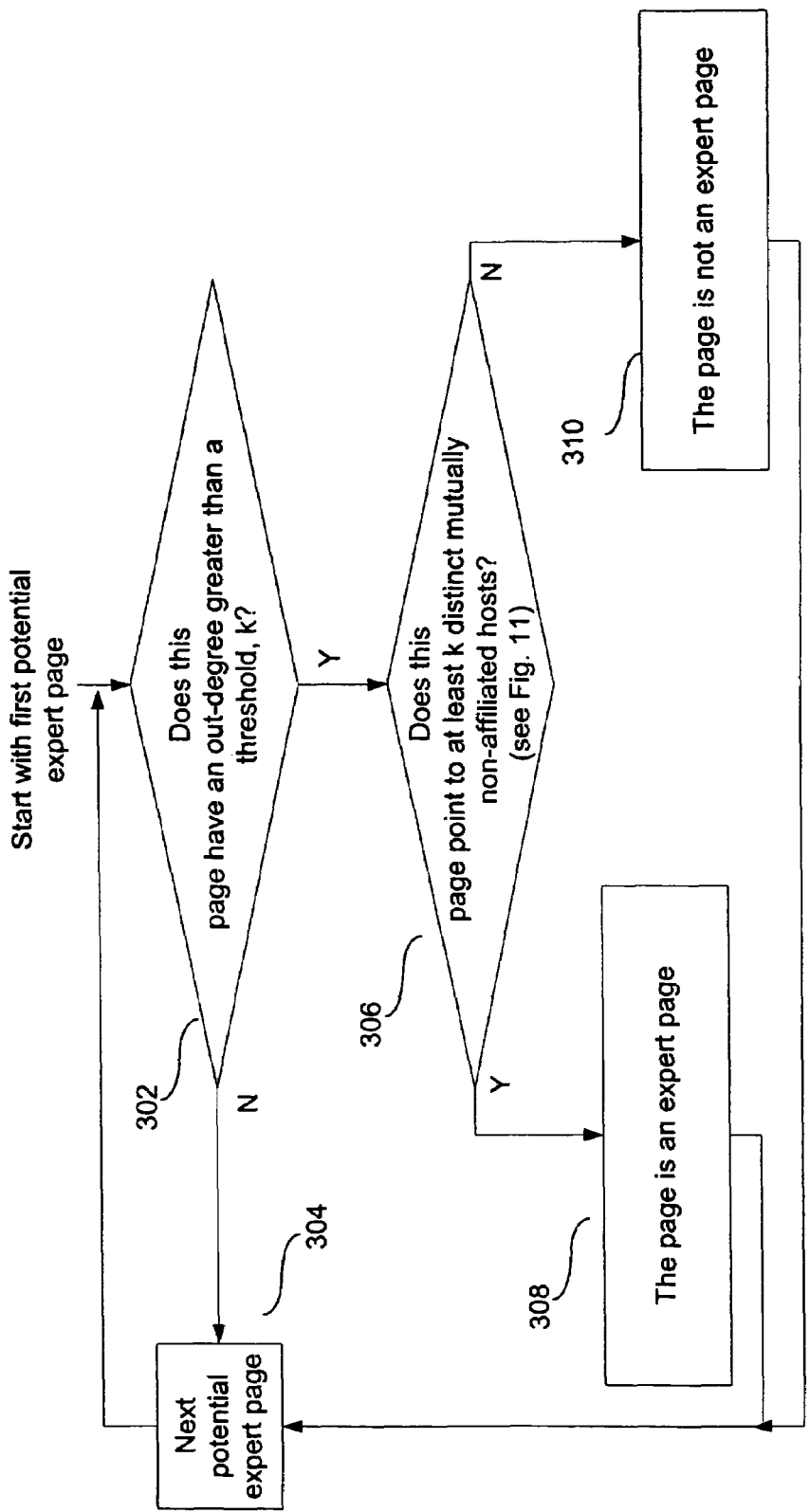
FIGS. 3(a) and 3(b) are flow charts of alternate methods of determining expert pages.

As shown in element 302 of FIG. 3(a), all pages with out-degree greater than a threshold, k (e.g., k=5) are considered. The out-degree is the number of out-going links from the page. In element 306, if the URLs of a such a page point to k distinct non-affiliated hosts that are mutually non-affiliated as well, the page is an expert page (see element 308). In the described embodiment, all selected expert pages are downloaded from the web if they are not already available.

Figure 3B:
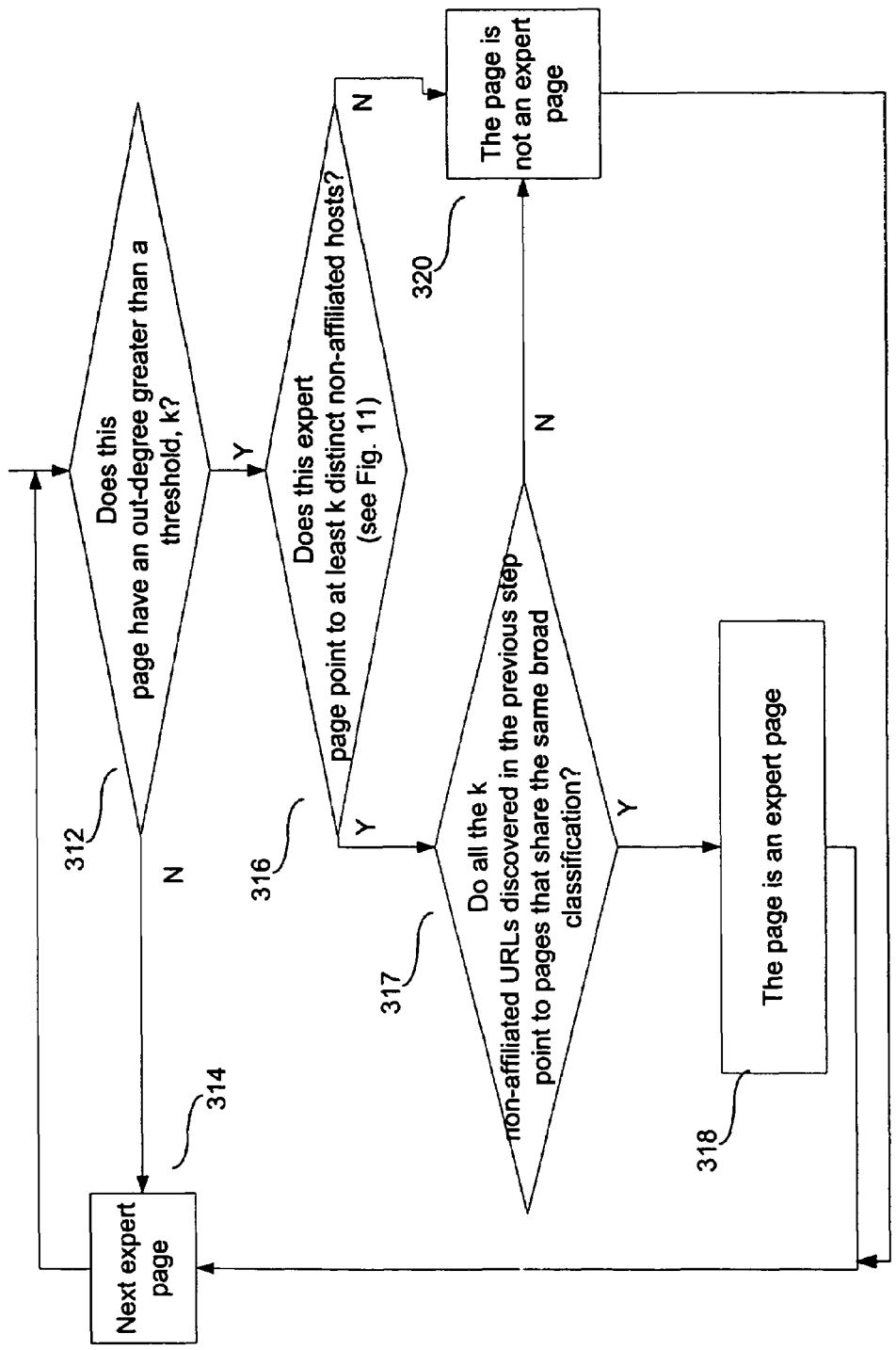

FIG. 3(b) shows an alternate method of determining expert pages. As shown in element 317 of FIG. 3(b), if a broad classification (such as Arts, Science, Internet etc.) is known for every page in the search engine database then we can additionally require that all the k non-affiliated URLs discovered in the previous step point to pages that share the same broad classification.

c) Building an Expert Reverse Index

Figure 4:
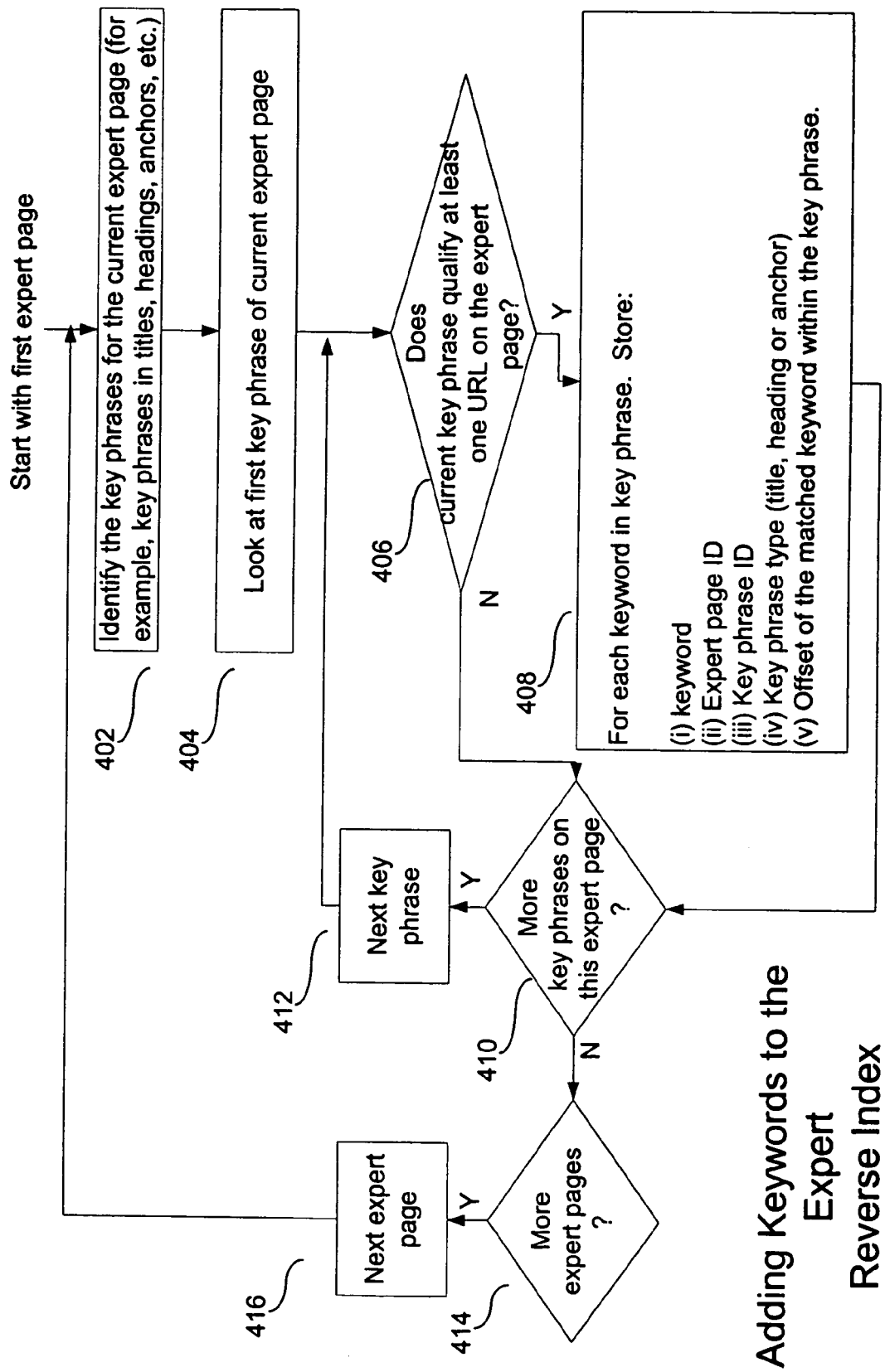
FIG. 4 is a flow chart of a method for adding keywords in the expert pages to an expert reverse index.

FIG. 4 is a flow chart of a method for adding keywords in the expert pages to an expert reverse index. Only "keywords" contained within "key phrases" of the expert are indexed. As shown in element 402, key phrases are phrases associated with titles, headings and anchors within the HTML of a page. The keywords of key phrases that "qualify" at least one URL on the page are added the to expert reverse index.

Figure 5:
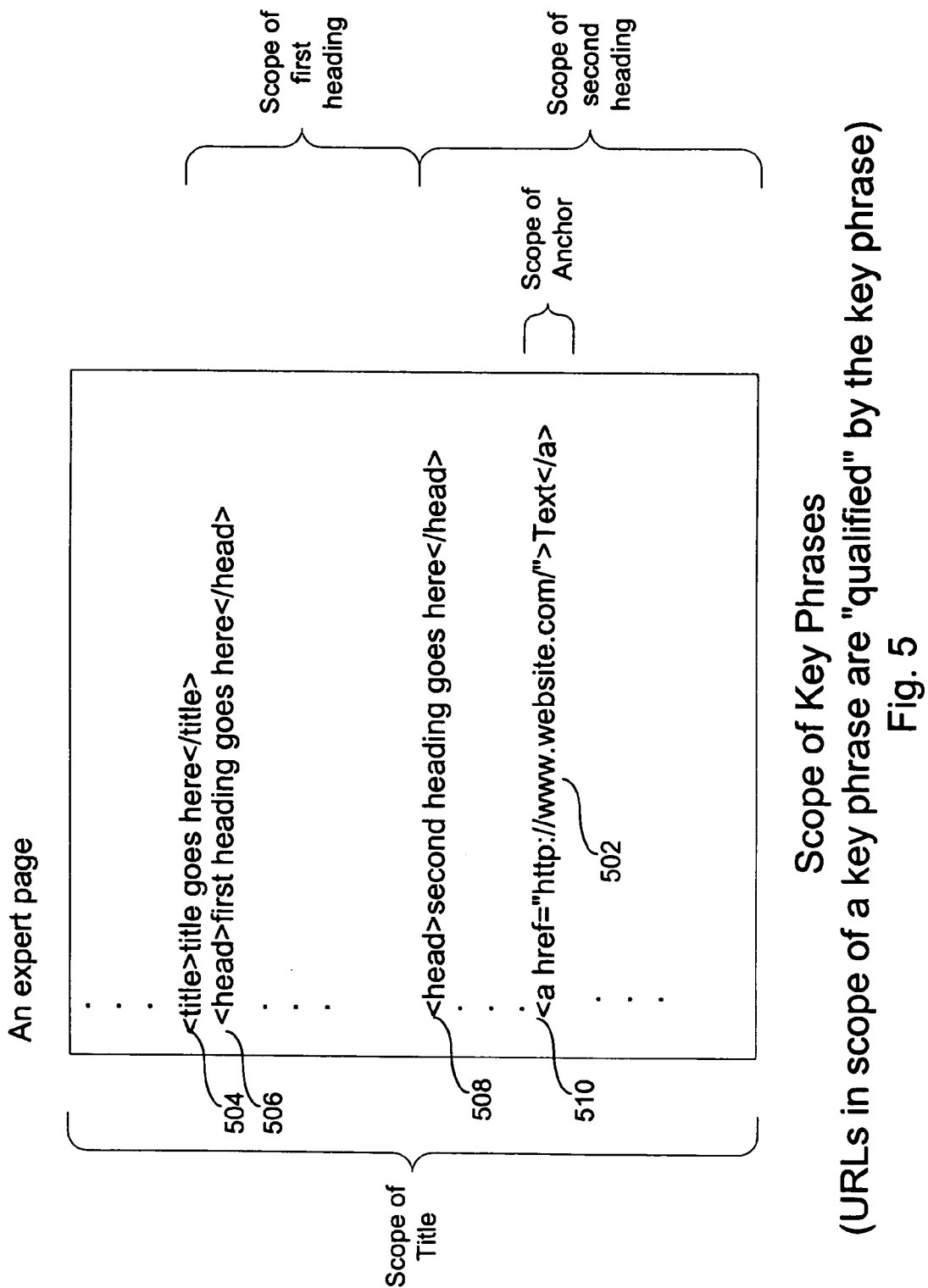
FIG. 5 is a diagram showing the scope of various types of key phrases.

As shown in FIG. 5, every key phrase has a scope within the page text. URLs located within the scope of a key phrase are said to be "qualified" by the key phrase. For example, a title has a scope that qualifies all URLs in the page. A heading's scope qualifies all URLs until the next heading of greater or equal importance. An anchor's scope only extends over the URL it is associated with.

Thus, in FIG. 5, the URL http://www.website.com 502 is qualified by the key phrase in title 504; by the key phrase in second heading 508; and by the key phrase in anchor 510. It is not qualified by the key phrase in first heading 506, since it is not in the scope of first heading 506.

Figures 6, 7:
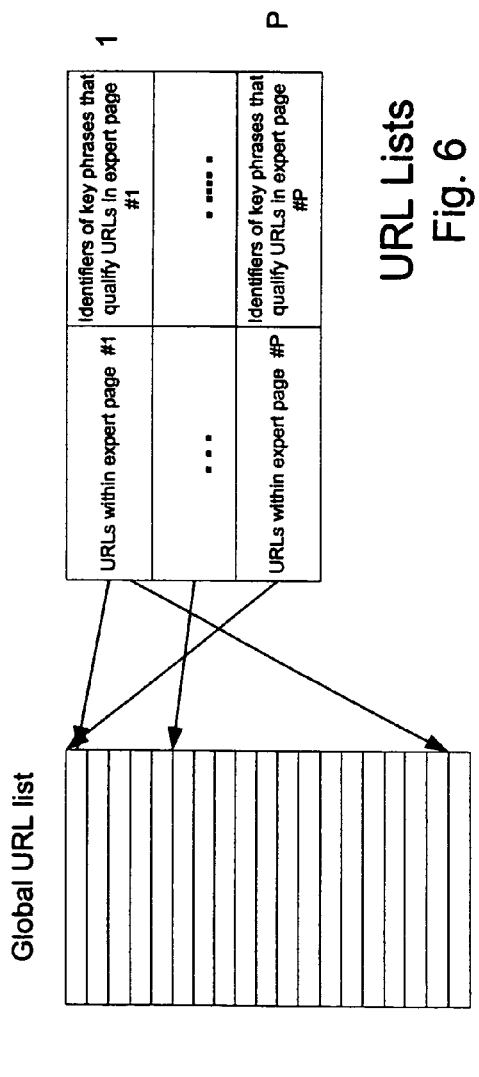
FIG. 6 shows an example of a URL list data structure.
FIG. 7 is an example of an expert reverse index.

In element 408, if a key phrase qualifies at least one URL, the keywords in the key phrase are indexed. As shown in FIG. 7, the index is organized so that we also store:

i) An ID to identify the expert page containing the keyword, ii) An ID to identify the key phrase uniquely within the page iii) A code to denote the kind of phrase it is (title, heading or anchor)

iv) The offset of the keyword within the phrase.

In addition, as shown in FIG. 6, a list of URLs is maintained for each expert page showing the URLs within the page (as indexes into a global list of URLs). The identifiers of the key phrases that qualify the URLs is also maintained.

In the described embodiment, to avoid giving long key phrases an advantage the number of keywords indexed for any given key phrase is limited (e.g., to 32).

Elements 410, 412, 414, and 416 indicate that each keyword of each qualifying key phrase of each expert page is indexed.

B. Ranking Experts

For an expert to be useful in response to a query, the minimum requirement is that there is at least one URL which contains all the query keywords in the key phrases that qualify it. A fast approximation would be to require all query keywords to occur in the page. Thereupon the an Expert Score of the expert is computed as a 3-tuple of the form ($S_0$, $S_1$, $S_2$).

Figure 8:
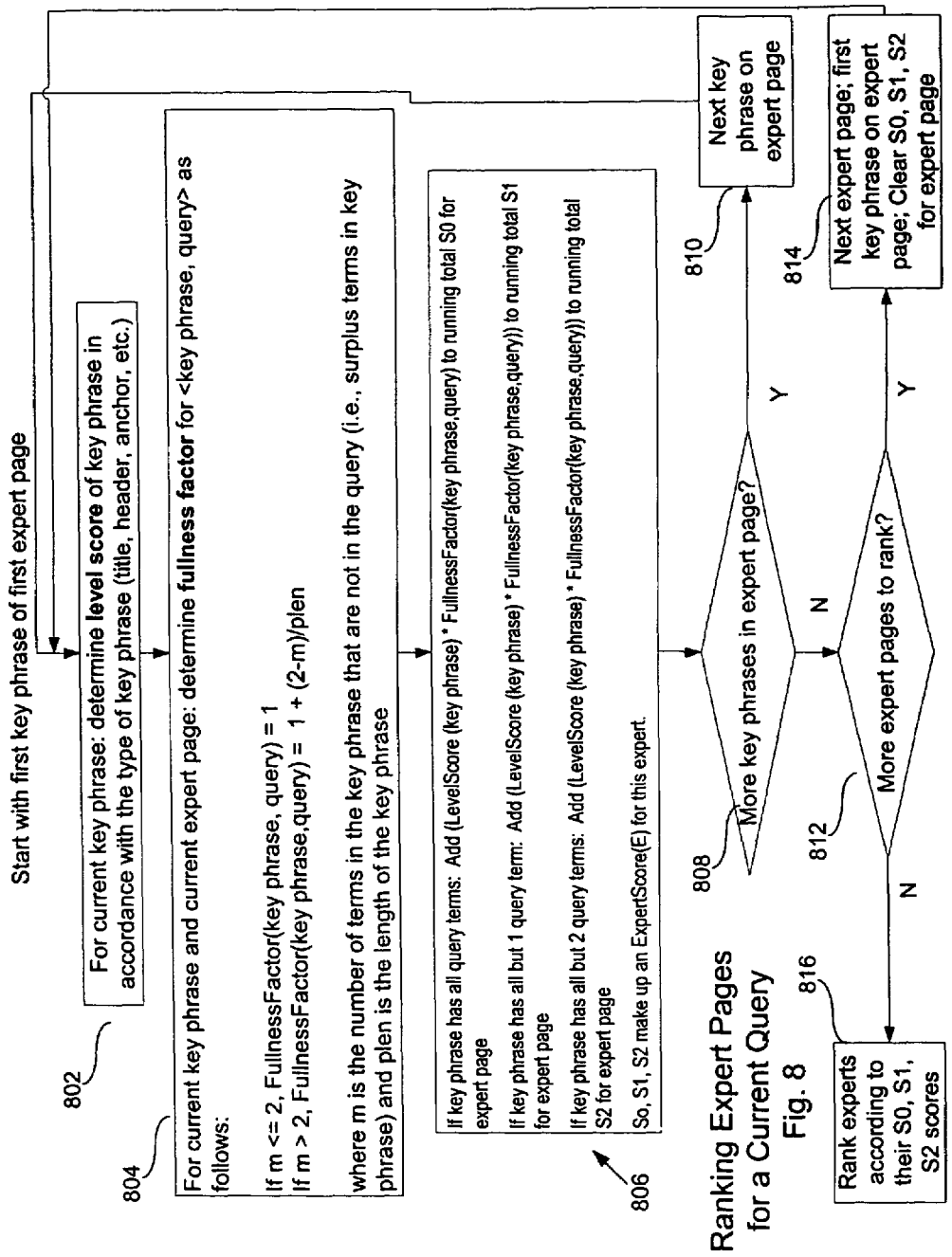
FIG. 8 is a flow chart of a method of ranking expert pages for a current query.

FIG. 8 is a flow chart of a method of ranking expert pages in accordance with a current query.

Element 802 shows how to determine a level score for a current phrase on a current expert page. LevelScore(p) is a score assigned to the phrase by virtue of the type of phrase it is. E.g., we could use a LevelScore of 16 for title phrases, 6 for headings and 1 for anchor text. This is based on the assumption that the title text is more useful than the heading text, which is more useful than an anchor text match in determining what the expert page is about.

Element 804 shows how to determine a fullness factor for a current phrase (p) on a current expert page for the query FullnessFactor(p,q) is a measure of the number of terms in p covered by the terms in q. Let plen be the length of p. Let m be the number of terms in p which are not in q (i.e., surplus terms in the phrase).

If $m<=2$, FullnessFactor$(p,q)=1$

If $m>2$, FullnessFactor$(p,q)=1+(2-m)/plen$

Element 806 shows how to determine the expert score for a current expert page. Let k be the number of terms in the input query, q. The component $S_i$ of the score is computed by considering only key phrases that contain precisely k−i of the query terms. E.g., $S_0$ is the score computed from phrases containing all the query terms.

$$S_i = \Sigma_{(key\ phrases\ p\ with\ k-i\ query\ terms)} \text{LevelScore}(p) * \text{FullnessFactor}(p,q)$$

The score of the expert can be converted into a scalar by determining a weighted sum of the components. E.g., ExpertScore=$2^{32}*S_0 + 2^{16}*S_1 + S_2$. In other words, $S_0$, $S_1$, and $S_2$ can be stored, for example, in respective bytes in memory to form a scalar.

Elements 808, 810, 812, and 814 indicate that each keyword an expert page is considered when determining the expert score for that page. An expert score is determined for each expert page.

Element 816 ranks experts in accordance with their expert scores, which, in the described embodiment, are formed from scores $S_0$, $S_1$, and $S_2$.

C. Target Ranking

A page is an "authority" on the query topic if and only if some of the best experts on the query topic point to it. Of course in practice some expert pages may be experts on a broader or related topic. If so only a subset of the hyperlinks on the expert page may be relevant. In such cases the links being considered have to be carefully chosen to ensure that their qualifying text matches the query. By combining relevant out-links from many experts on the query topic we can find the pages that are most highly regarded by the community of pages related to the query topic.

Given the top ranked matching expert pages and associated match information determined by the method of FIG. 8, we select a subset of the hyperlinks within the expert pages. (Associated match information is preferably information about the key phrases within the expert pages that match query terms.) Specifically, we select links that we know to have all the query terms associated with them. This implies that the link matches the query. With further connectivity analysis on the selected links we identity a subset of their targets as the top-ranked pages on the query topic. The targets we identify are those that are linked to by at least two non-affiliated expert pages on the topic. The targets are ranked by a ranking score which is computed by combining the scores of the experts pointing to the target.

Figure 9:
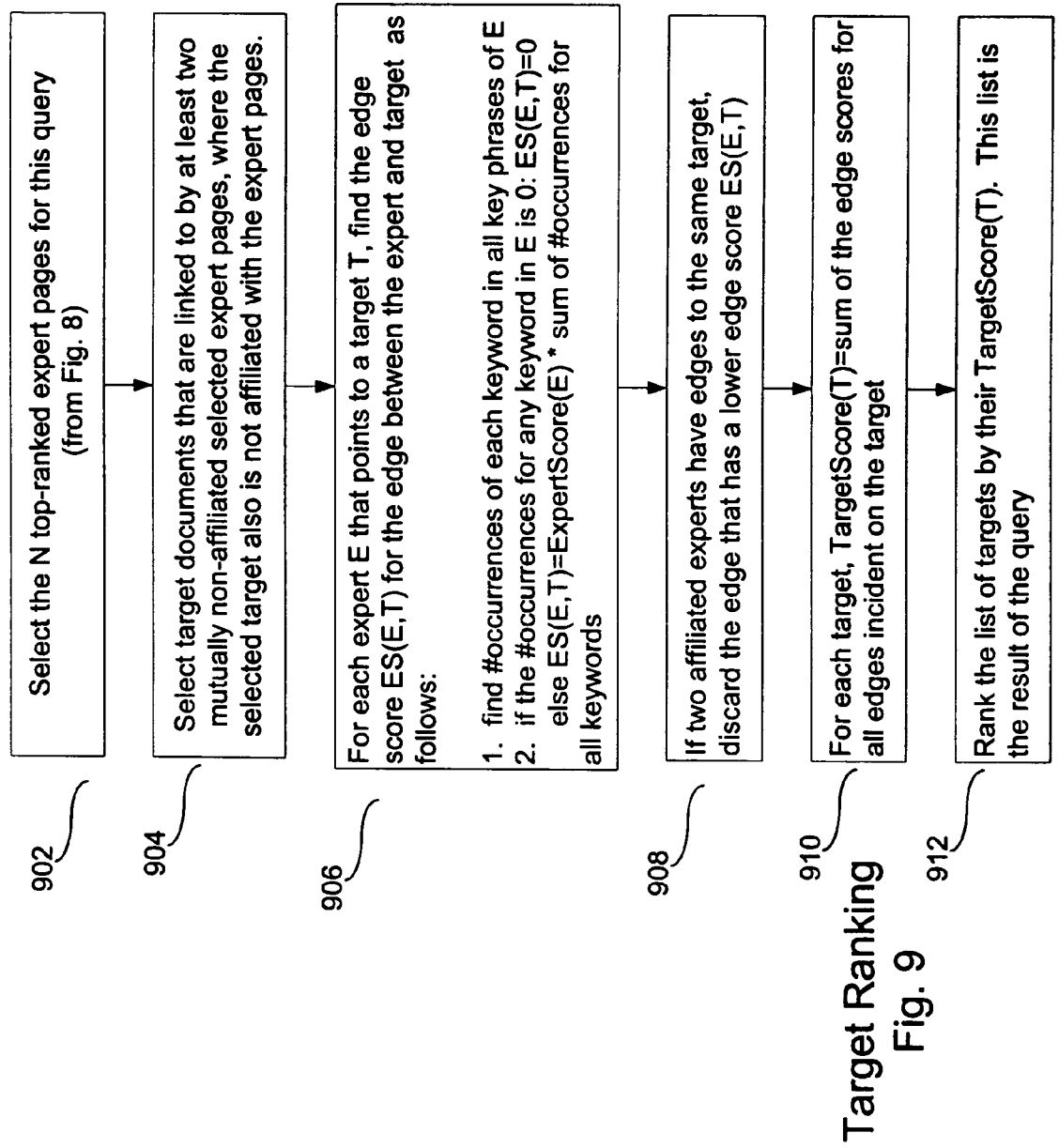
FIG. 9 is a flow chart of a method of target ranking.
Figure 11A:
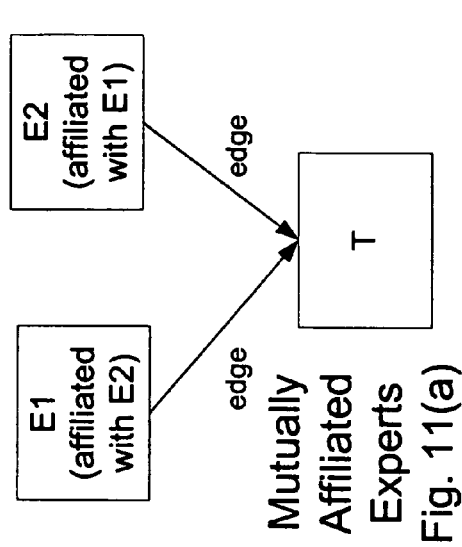
FIG. 11(a) shows an example of affiliated expert pages.
Figure 11B:
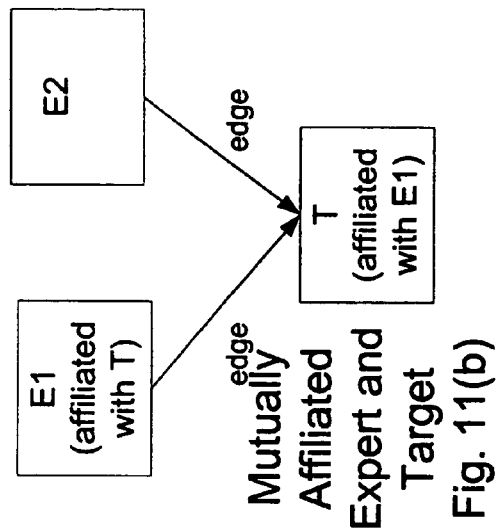
FIG. 11(b) shows an example of an affiliated expert page and an affiliated target page.
Figure 10:
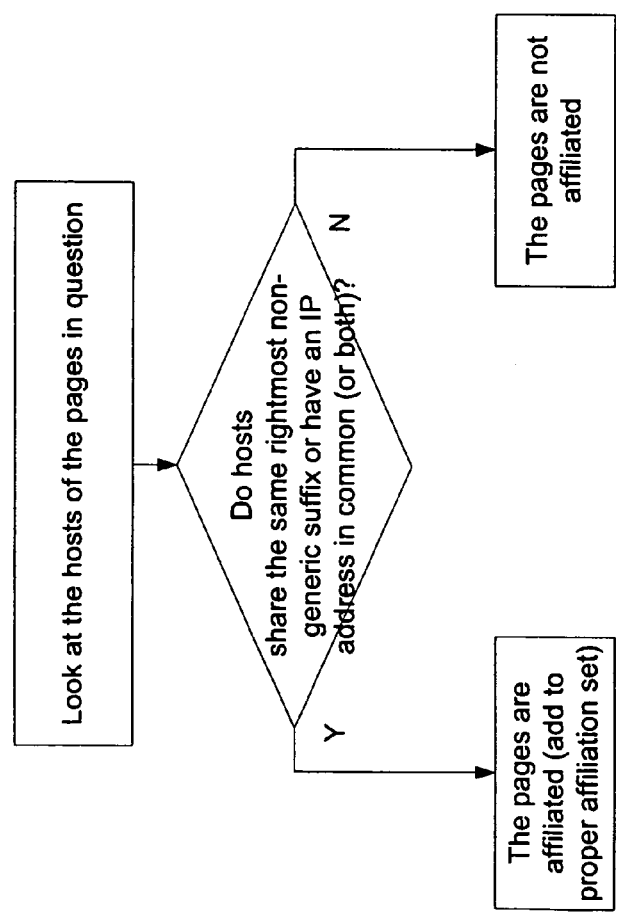
FIG. 10 is a flow chart of a method of determining whether two pages are affiliated.

In element 902 of FIG. 9 we consider the top N experts in the ranking from the previous step (for example, N=200) and consider the pages they point to. These pages are called targets. It is from this set of targets that we select top ranked pages. For a target to be considered it must be pointed to from at least two experts on hosts that are mutually non-affiliated and are not affiliated to the target. For all targets that qualify we compute a ranking score.

The ranking score for a target T is computed in three steps:

1. As shown in element 906, for every expert E that points to target T we draw a directed edge (E,T). We compute an "edge score" for the edge (E,T) represented by EdgeScore (E,T), which is computed thus:

Let occ(k) be the number of distinct key phrases of expert E, within which a query keyword k occurs. If occ(k) is 0 for any query keyword then the EdgeScore(E,T)=0.

Otherwise, EdgeScore(E,T)=ExpertScore(E)* $\Sigma_{(query\ keywords\ k)}$occ(k)

2. As shown in step 908, we next check for affiliations between expert pages that point to the same target. If two affiliated experts have edges to the same target T, we then discard one of the two edges. Specifically, we discard the edge which has the lower EdgeScore of the two.

3. As shown in element 910, to compute the TargetScore of a target we sum the EdgeScores of all edges incident on it.

In element 912, the list of targets is ranked by TargetScore. Optionally, this list can be filtered by testing if the query keywords are present in the targets. Optionally, we can match the query keywords against each target compute a MatchScore using content analysis, and combine the TargetScore with the MatchScore before ranking the targets.

III. Summary

The approach described above generates a list of target pages which are likely to be very authoritative pages on the topic of the query. This is by virtue of the fact that they are highly valued by pages on the WWW which address the topic of the query. In computing the value of a target page from the hyperlinks pointing to it, we only consider links originating from pages that seem to be experts. Specifically we require them to point to many non-affiliated sites. This is an indication that these pages were created for the purpose of directing users to resources, and hence we regard them as experts. Additionally, to boost relevance, we require a match between the query and the text on the expert page which qualifies the hyperlink being considered. This insures that hyperlinks being considered are on the query topic. The result of the steps described above is to generate a listing of pages that are highly relevant to the user's query and of high quality, which is the goal of our invention.

The described technique is a dynamic one that is performed for each new query. Hence, it can produce more relevant results. Because the described technique evaluates experts on their content match to the user's query, rather than on their linkage to popular target pages, the described method prevents the scores of "niche experts" (i.e., experts that point to new or relatively unknown targets) from being driven to zero.

From the above description, it will be apparent that the invention disclosed herein provides a novel and advantageous system and method of searching large numbers of hypertext documents, such as the hypertext documents of the world wide web.

What is claimed is:

1. A computer-implemented method for searching a large number of hypertext documents in accordance with a search query, comprising:
    forming a set of expert documents from the set of all hypertext documents crawled without reference to the search query;
    ranking the expert documents in accordance with the search query;
    ranking target documents pointed to by the ranked expert documents; and
    returning a results list based on the ranked target documents.

2. The computer-implemented method of claim 1, wherein the hypertext documents are pages in the world wide web.

3. The computer-implemented method of claim 1, wherein the hypertext documents are sites in the world wide web.

4. The computer-implemented method of claim 1, wherein the hypertext documents are documents in a hypertext database.

5. The computer-implemented method of claim 1, wherein an expert reverse index is constructed in memory for keywords appearing in the expert documents, the expert reverse index identifying the location of the keywords in the expert documents.

6. The computer-implemented method of claim 5, wherein a keyword of an expert document is included in the expert reverse index if the keyword is part of a key phrase that qualifies at least one URL in the expert document.

7. The computer-implemented method of claim 6, wherein a key phrase qualifies a URL if the URL is within the scope of the key phrase in the expert document.

8. The computer-implemented method of claim 6, wherein a key phrase in an HTML title qualifies all URLs in the entire document.

9. The computer-implemented method of claim 6, wherein a key phrase in an HTML heading qualifies all URLs in that portion of the document before a next HTML heading in the document of greater or equal importance.

10. The computer-implemented method of claim 6, wherein a key phrase in an HTML anchor qualifies the URLs in the anchor.

11. The computer-implemented method of claim 1, wherein forming a set of expert documents includes:
    determining a document having at least a predetermined number of outlinks to be an expert document if the document also points to at least the predetermined number of targets on distinct non-affiliated hosts.

12. The computer-implemented method of claim 11, wherein expert documents additionally must point to documents that share the same broad classification.

13. The computer-implemented method of claim 1, wherein ranking target documents pointed to by the expert documents includes:
    determining a plurality of edge scores for each target document, where an edge score is determined for edges between the expert documents and the target document;
    determining a target score in accordance with the edge scores of the target document;
    ranking the target documents in accordance with the target scores.

14. The computer-implemented method of claim 13, further including:
    determining an edge score only for those links to the target document from a predetermined number of top-ranked expert documents.

15. The computer-implemented method of claim 13, further including selecting target documents to be ranked that are linked to by at least two mutually non-affiliated selected expert documents, where the selected target also is not affiliated with the expert documents.

16. The computer-implemented method of claim 13, where an edge score between an expert document and a target document ES(E,T) is determined as follows, where ExpertScore reflects the rankings of the expert documents:
    a) find #occurrences of each keyword in all keyphrases of expert document E
    b) if the #occurrences for any keyword in E is 0: ES(E, T)=0 else ES(E,T)=ExpertScore(E)*sum of #occurrences for all keywords.

17. The computer-implemented method of claim 13, wherein, if two affiliated experts have edges to the same target, the edge having a lower edge score is discarded and is not used to determine the target score.

18. The computer-implemented method of claim 17, wherein two hypertext documents are affiliated if at least one of the following is true: 1) they share the same rightmost non-generic suffix and 2) they have an IP address in common.

19. The computer-implemented method of claim 1, wherein ranking the expert documents in accordance with the search query comprises:
    determining a level score for each of the expert documents;
    determining a fullness factor for each key phrase on each of the expert documents; and
    determining an expert score for each expert document in accordance with the level score of the expert document and the fullness factors for the key phrases of the expert document.

20. The computer-implemented method of claim 1, forming a set of expert documents occurs before a search query is received.

21. An apparatus that searches a large number of hypertext documents in accordance with a search query, comprising:
    a processor and a memory, the processor executing instructions stored in the memory, the instruction comprising:
    a software portion configured to form a set of expert documents from the set of all documents crawled without reference to the search query;
    a software portion configured to rank the expert documents in accordance with the search query;
    a software portion configured to rank target documents pointed to by the ranked expert documents; and
    a software portion configured to return a results list based on the ranked target documents.

22. A computer program product, comprising:
    a computer readable medium having computer readable instructions stored therein to search a large number of hypertext documents in accordance with a search query, including:
    computer readable program code devices for causing a computer to form a set of expert documents from the set of all documents crawled without reference to the search query;
    computer readable program code devices for causing a computer to rank the expert documents in accordance with the search query;
    computer readable program code devices for causing a computer to rank target documents pointed to by the ranked expert documents; and
    computer readable program code devices for causing a computer to return a results list based on the ranked target documents.

* * * * *

UNITED STATES PATENT AND TRADEMARK OFFICE
CERTIFICATE OF CORRECTION

PATENT NO.         : 7,346,604 B1
APPLICATION NO.  : 09/418418
DATED              : March 18, 2008
INVENTOR(S)        : Krishna A. Bharat et al.

Page 1 of 1

It is certified that error appears in the above-identified patent and that said Letters Patent is hereby corrected as shown below:

In column 4, line 19, delete "queries/it" and insert -- queries. It --, therefor.

In column 4, line 21, delete "scribed" and insert -- described --, therefor.

In column 4, line 22, delete "arrow" and insert -- narrow --, therefor.

Signed and Sealed this

Twenty-third Day of June, 2009

JOHN DOLL
*Acting Director of the United States Patent and Trademark Office*